(12) United States Patent
Mishra et al.

(10) Patent No.: US 12,340,534 B2
(45) Date of Patent: Jun. 24, 2025

(54) INFRASTRUCTURE TO SUPPORT VEHICLE NAVIGATION

(71) Applicant: Ford Global Technologies, LLC, Dearborn, MI (US)

(72) Inventors: Subodh Mishra, Bryan, TX (US); Punarjay Chakravarty, Campbell, CA (US); Sagar Manglani, Cupertino, CA (US); Sushruth Nagesh, Mountain View, CA (US); Gaurav Pandey, College Station, TX (US)

(73) Assignee: Ford Global Technologies, LLC, Dearborn, MI (US)

( * ) Notice: Subject to any disclaimer, the term of this patent is extended or adjusted under 35 U.S.C. 154(b) by 411 days.

(21) Appl. No.: 17/815,252

(22) Filed: Jul. 27, 2022

(65) Prior Publication Data
US 2024/0037772 A1 Feb. 1, 2024

(51) Int. Cl.
G06K 9/00 (2022.01)
G06T 7/70 (2017.01)

(52) U.S. Cl.
CPC ...... *G06T 7/70* (2017.01); *G06T 2207/30244* (2013.01)

(58) Field of Classification Search
None
See application file for complete search history.

(56) References Cited

U.S. PATENT DOCUMENTS

| 6,101,455 A | 8/2000 | Davis |
| 10,647,001 B2 | 5/2020 | Namiki et al. |
| 11,090,810 B2 | 8/2021 | Harada |
| 2017/0176999 A1* | 6/2017 | Bobda ............... G05D 1/0297 |
| 2022/0357751 A1* | 11/2022 | Thomson ............. G01S 19/14 |
| 2023/0360406 A1* | 11/2023 | Yu ............................. G06T 7/73 |

FOREIGN PATENT DOCUMENTS

| CN | 103279949 A | 9/2013 |
| KR | 1020180007263 A | 1/2018 |
| WO | WO-2018015519 A1 * | 1/2018 ............... A01K 1/00 |

OTHER PUBLICATIONS

Agarwal et al., "Ceres Solver—A Large Scale Non-linear Optimization Library", https://github.com/ceres-solver/ceres-solver.
(Continued)

*Primary Examiner* — Utpal D Shah
*Assistant Examiner* — Kevin M Coomber
(74) *Attorney, Agent, or Firm* — Frank A. MacKenzie; Brooks Kushman P.C.

(57) ABSTRACT

A robot can be moved in a structure that includes a plurality of downward-facing cameras, and, as the robot moves, upward images can be captured with an upward-facing camera mounted to the robot. Downward images can be captured with the respective downward-facing cameras. Upward-facing camera poses can be determined at respective times based on the upward images. Further, respective poses of the downward-facing cameras can be determined based on (a) describing motion of the robot from the downward images, and (b) the upward-facing camera poses determined from the upward images.

20 Claims, 10 Drawing Sheets

(56) References Cited

OTHER PUBLICATIONS

Galvez-Lopez et al., "Bags of Binary Words for Fast Place Recognition in Image Sequences", IEEE Transactions on Robotics, Apr. 17, 2012. Short Paper.

Mishra et al., "Look Both Ways: Bidirectional Visual Sensing Between a Mobile Robot and a Network of Fixed Infrastructure Cameras for Multi-Sensor SLAM and Calibration", Feb. 19, 2022.

Shoemake, "Animating Rotation with Quaternion Curves", San Francisco, Jul. 22-26, vol. 19, Nov. 3, 1985, copyright 1985 ACM 0-89791-166-0/85/007/0245.

Taylor et al., "Motion-Based Calibration of Multimodal Sensor Arrays", 2015 IEEE International Conference on Robotics and Automation (ICRA), Washington State Convention Center, Seattle, Washington, May 26-30, 2015.

Zhang et al., "A Tutorial on Quantitative Trajectory Evaluation for Visual(-Inertial) Odometry", 2018 IEEE/RSJ International Conference on Intelligent Robots and Systems (IROS), Oct. 1-5, 2018, Madrid, Spain.

\* cited by examiner

INFRASTRUCTURE TO SUPPORT VEHICLE NAVIGATION

BACKGROUND

A vehicle can use onboard sensors to support vehicle operations, including determining and/or navigating along a path. For example, a vehicle can use data from the Global Positioning System (GPS) data However, GPS data depends on receiving signals from satellites, which may sometimes be unavailable. For example, satellite signals may be unavailable to vehicles inside of structures such as warehouses, parking garages, etc. Moreover, data from sensors such as cameras may be unavailable due to lighting conditions, obstructions, etc., e.g., inside such structures.

DETAILED DESCRIPTION

Introduction

Figure 1A:
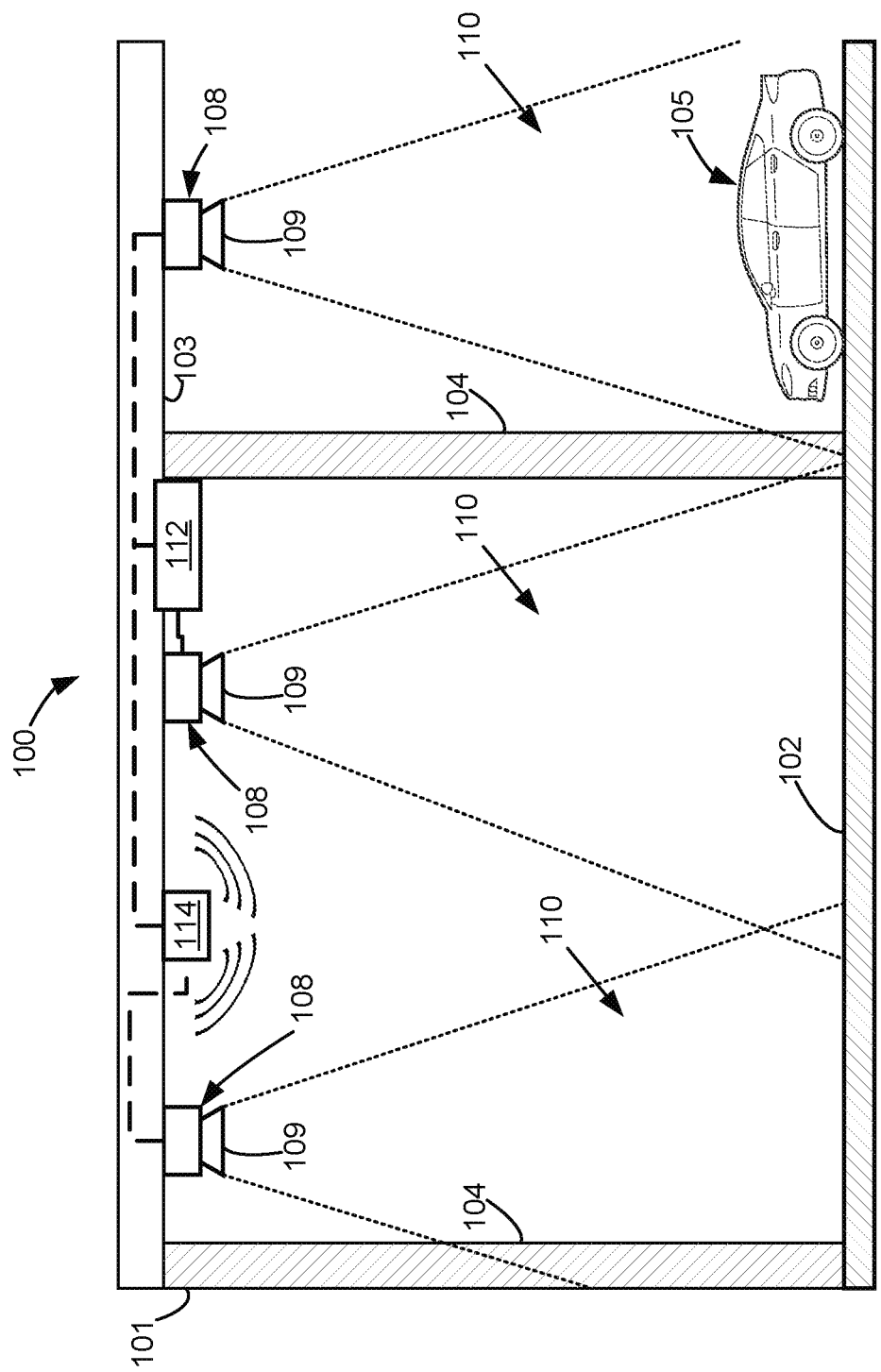
FIG. 1A illustrates an example locator system in an operation mode.
Figure 1B:
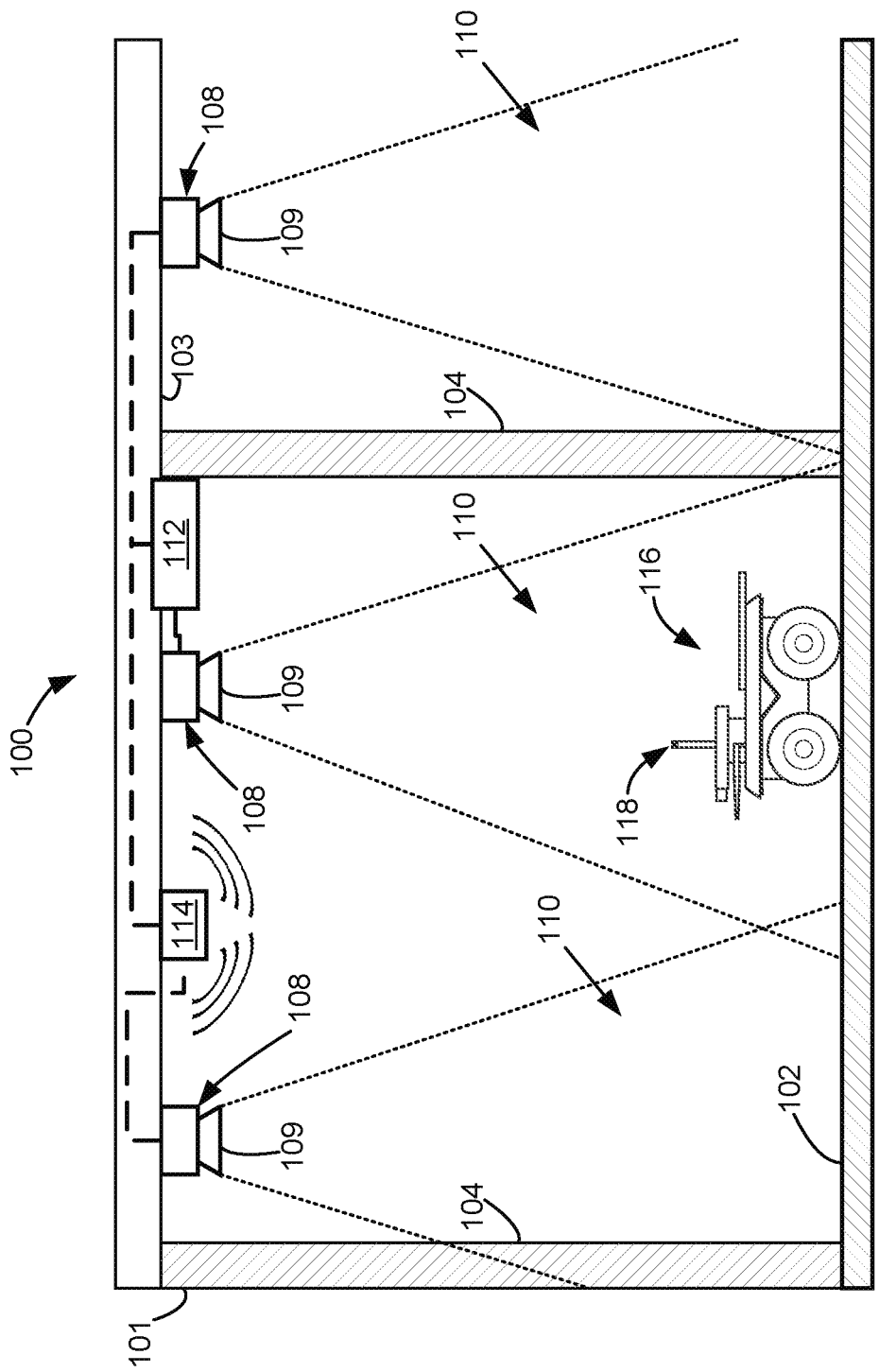
FIG. 1B illustrates the example locator system in a calibration mode.

With reference to the various Figures, a vehicle locator system 100 can be installed in a building structure 101, e.g., a parking garage or warehouse. The structure includes a floor 102 and a ceiling 103 that may be supported by supports 104, i.e., pillars or walls. The system 100 includes a plurality of network nodes 108 mounted to a ceiling 103 of the structure 101. The network nodes 108 each include cameras 109 downwardly directed toward a floor 102. The cameras 109 thus have respective fields of view 110, which may or may not overlap one another, that include respective portions of the floor 102. In an operation mode (FIG. 1A) the system 100 can determine a location or locations of a vehicle 105 as it is moving through the structure 101. For the system 102 accurately predict the vehicle 105 location, the calibration mode (FIG. 1B) can be used in which a mobile robot 116 with an upward facing camera 118 is operated in the structure 101. Calibration of the system 100 includes determining respective poses of cameras 109. By tracking robot 118 movement through the structure 101 with visual odometry (VO) and capturing images of a fiducial marker 120 on the robot 116 with the stationary cameras 109, while the robot camera 118 captures images of the stationary cameras 109 along with landmarks such as 3D points 126 (see FIG. 5) poses of the cameras 109 can be determined. When calibrated with the determined poses of the cameras 109, the system 101 can determine locations of vehicles 105 based on images captured by the cameras 109 so that actuation of vehicles can be commanded within the structure 101.

In implementations discussed herein, the locator system 100 is provided to locate, and support navigation of, vehicles 108 in a structure 101. However, principles discussed herein could be applied to calibrating and/or operating systems for locating and/or tracking various objects in various environments.

A method comprises moving a robot in a structure that includes a plurality of downward-facing cameras, and, as the robot moves: capturing upward images with an upward-facing camera mounted to the robot, and capturing downward images with the respective downward-facing cameras; determining upward-facing camera poses at respective times based on the upward images; and determining respective poses of the downward-facing cameras based on (a) describing motion of the robot from the downward images, and (b) the upward-facing camera poses determined from the upward images. The method can further comprise determining upward-facing camera poses at respective times based on the upward images includes estimating motion of the robot from visual odometry. Describing the motion of the robot in the downward images can include determining a scale of the motion based on a fiducial marker fixed to the robot. Describing the motion of the robot in the downward images can include determining a spatial offset between the fiducial marker and the upward-facing camera based on the scale. The scale can be determined from an interpolated robot pose determined from averaging translation and rotation components of first and second robot poses measured at first and second timesteps. The scale can be determined from at least some of the upward images and at least some of the downward images.

The respective poses of the downward-facing cameras can be optimized by optimizing a translation component of the respective poses to minimize a reprojection error of the upward-facing camera. The respective poses of the downward-facing cameras can be optimized by optimizing a rotation component of the camera poses by minimizing a constraint between two of the plurality of downward-facing cameras that have an overlapping field of view.

The upward-facing camera poses can be determined by minimizing residual error in detections of 3-D points with the upward-facing camera.

Actuation of the vehicle can be commanded based on second downward images captured after the respective poses of the downward-facing cameras have been determined.

A system comprises a processor and a memory, the memory storing instructions executable such that the processor is programmed to receive images from a first downward-facing camera that is one of a plurality of downward-facing cameras; determine a location of a vehicle based on the images and a pose of the first downward-facing camera; and command actuation of the vehicle based on the determined location; wherein the pose of the downward facing camera is based on (a) determining robot poses of a robot including an upward-facing camera capturing upward images of the respective plurality of downward-facing cameras, and (b) describing motion of the robot in downward images captured by respective downward-facing cameras.

Determining upward-facing camera poses at respective times based on the upward images can include estimating motion of the robot from visual odometry. Describing the motion of the robot in the downward images can include determining a scale of the motion based on a fiducial marker fixed to the robot. Describing the motion of the robot in the downward images can include determining a spatial offset between the fiducial marker and the upward-facing camera based on the scale. The scale can be determined from an interpolated robot pose determined from averaging translation and rotation components of first and second robot poses measured at first and second timesteps. The scale can be determined from at least some of the upward images and at least some of the downward images. The respective poses of the downward-facing cameras can be optimized by optimizing a translation component of the respective poses to minimize a reprojection error of the upward-facing camera. The respective poses of the downward-facing cameras can be optimized by optimizing a rotation component of the camera poses by minimizing a constraint between two of the plurality of downward-facing cameras that have an overlapping field of view. The upward-facing camera poses can be determined by minimizing residual error in detections of 3-D points with the upward-facing camera. Actuation of the vehicle can be commanded based on second downward images captured after the respective poses of the downward-facing cameras have been determined.

System Elements

As mentioned above, the locator system 100 can be installed in a structure such as a parking garage, warehouse, etc., i.e., any building or structure that can accommodate a moving vehicle 105. A "vehicle" as that term is used herein refers to any ground vehicle, e.g., a bicycle, motorcycle, motorcar, etc. The mobile robot 116 is an example of a vehicle, as is the illustrated vehicle 105, which is a motorcar. The vehicle 105 and the mobile robot 116 are referenced separately herein for convenience; the vehicle 105 is typically in the system 100 in an operation mode, whereas the mobile robot 116 is typically used in a calibration mode.

In either mode of the locator system 100, the network nodes 108 and central computer 112 can communicate via various networking technologies, e.g., such as provided via the wireless transceiver 114. The network nodes 108 accordingly include respective processors and memories, whereby a network node 108 can obtain digital image data captured by its respective camera 109, and then provide the digital image data for storage and/or analysis, e.g., to the computer 112.

Computing devices herein such as may be included in a network node 109, a vehicle 105, a mobile robot computer 117, and/or computer 112, include respective processors and memories. A computer memory includes one or more forms of volatile and non-volatile computer-readable media, and stores instructions executable by the computer for performing various operations, including as disclosed herein. For example, a computer can be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data, such as digital image data, and/or communicating the sensor data. In another example, a computer may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer.

The computer memory can be of any suitable type, e.g., hard disk drives, solid state drives, servers, or any volatile or non-volatile media. The memory can store the collected data sent from the sensors. The memory can be a separate device from the computer, and the computer can retrieve information stored by the memory via a network. For example, a network can include a local area network, a wide area network, and/or a network in a vehicle, e.g., a CAN bus, a wireless network, etc. Alternatively or additionally, the memory can be part of the computer, e.g., as a memory of the computer.

In a vehicle, a computer may include programming to operate one or more of vehicle brakes, propulsion e.g., control of acceleration in the vehicle by controlling one or more of an internal combustion engine, electric motor, hybrid engine, etc., steering, climate control, interior and/or exterior lights, etc., as well as to determine whether and when the computer, as opposed to a human operator, is to control such operations. Additionally, the computer may be programmed to determine whether and when a human operator is to control such operations. The computer may include or be communicatively coupled to, e.g., via a vehicle network such as a communications bus, more than one processor, e.g., included in components such as sensors, electronic control units (ECUs) or the like included in the vehicle for monitoring and/or controlling various vehicle components, e.g., a powertrain controller, a brake controller, a steering controller, etc.

A computer can receive data from one or more sensors, e.g., cameras 109, 118. A sensor is a device that can obtain one or more measurements of one or more physical phenomena. For example, an image sensor can be a camera that captures images from a specified spectrum of light, e.g., the visible light spectrum. A camera image sensor can detect electromagnetic radiation in some range of wavelengths. For example, an image sensor may detect visible light, infrared radiation, ultraviolet light, or some range of wavelengths including visible, infrared, and/or ultraviolet light. For example, the camera can be a charge-coupled device CCD, complementary metal oxide semiconductor CMOS, or any other suitable type. For another example, the sensors may be a time-of-flight TOF cameras, which include a modulated light source for illuminating the environment and detect both reflected light from the modulated light source and ambient light to sense reflectivity amplitudes and distances to the scene. A camera could be included in or packaged with a computer, e.g., as a smartphone or tablet computer camera, or with a network node 108 as described herein, or could be communicatively coupled to the computer via a wired or wireless network.

As mentioned above, computers such as network nodes 108, the central computer 112, and the robot computer 117, can communicate with one another via any suitable mechanism, including a wide area network and/or various wired and/or wireless technologies. Exemplary communication networks include wireless communication networks e.g., using Bluetooth®, Bluetooth Low Energy BLE, IEEE 802.11 (or WiFi®), Ethernet, and or any other suitable technology or protocol for local area networks LAN and/or wide area networks WAN, including the Internet.

Accordingly, the wireless transceiver 114 may comprise a wireless chipset and matched antenna that facilitates short-range wireless communication links using protocols such as Bluetooth, Bluetooth Low Energy (BLE), Wi-Fi, Wi-Fi Direct, etc. Further, wireless transceiver 114 may be fixed to structure 101 and communicatively coupled via a wired connection to computer 112. In this manner, when the system 100 is in operation, wireless transceiver 114 may be able to receive requests from a vehicle 105 and pass them to computer 112 and/or receive data and/or commands from computer 112 and communicate the commands to vehicle 105. In a calibration mode of the system 100, the wireless transceiver 114 may receive data from network nodes 108 and the mobile robot computer 117.

Figure 2:
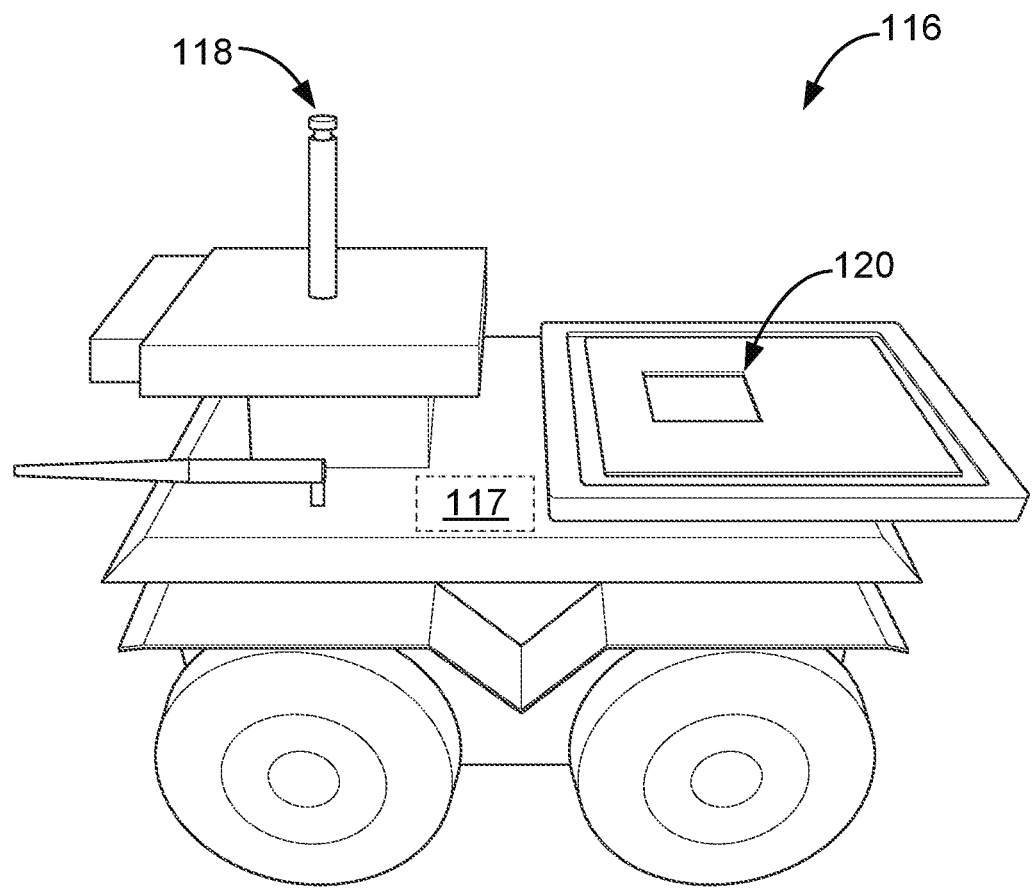
FIG. 2 is a perspective view of a mobile robot.

FIG. 2 provides a perspective view of an example mobile robot 116. In an example implementation, the mobile robot 116 is the "Jackal," sold by Clearpath Robotics™ of Kitchener, Ontario, Canada. As mentioned above, the mobile robot 116 can include a computer 117, and additionally can have a fisheye lens camera 118 mounted thereon in an upward-facing direction, i.e., to have a field of view of a ceiling 103 of a structure 101. Further, the mobile robot 116 can have affixed thereto a fiducial marker 120. In an example implementation, the fiducial marker 120 is an ArUco marker (see https://sourceforge.net/projects/aruco/), but any suitable marker could be used, such as a checkerboard or other patterned marker. Further, when the robot 116 is being operated for calibration of the system 100, the marker 120 typically is backlit to aid detection in images captured by stationary cameras 109.

Figure 3:
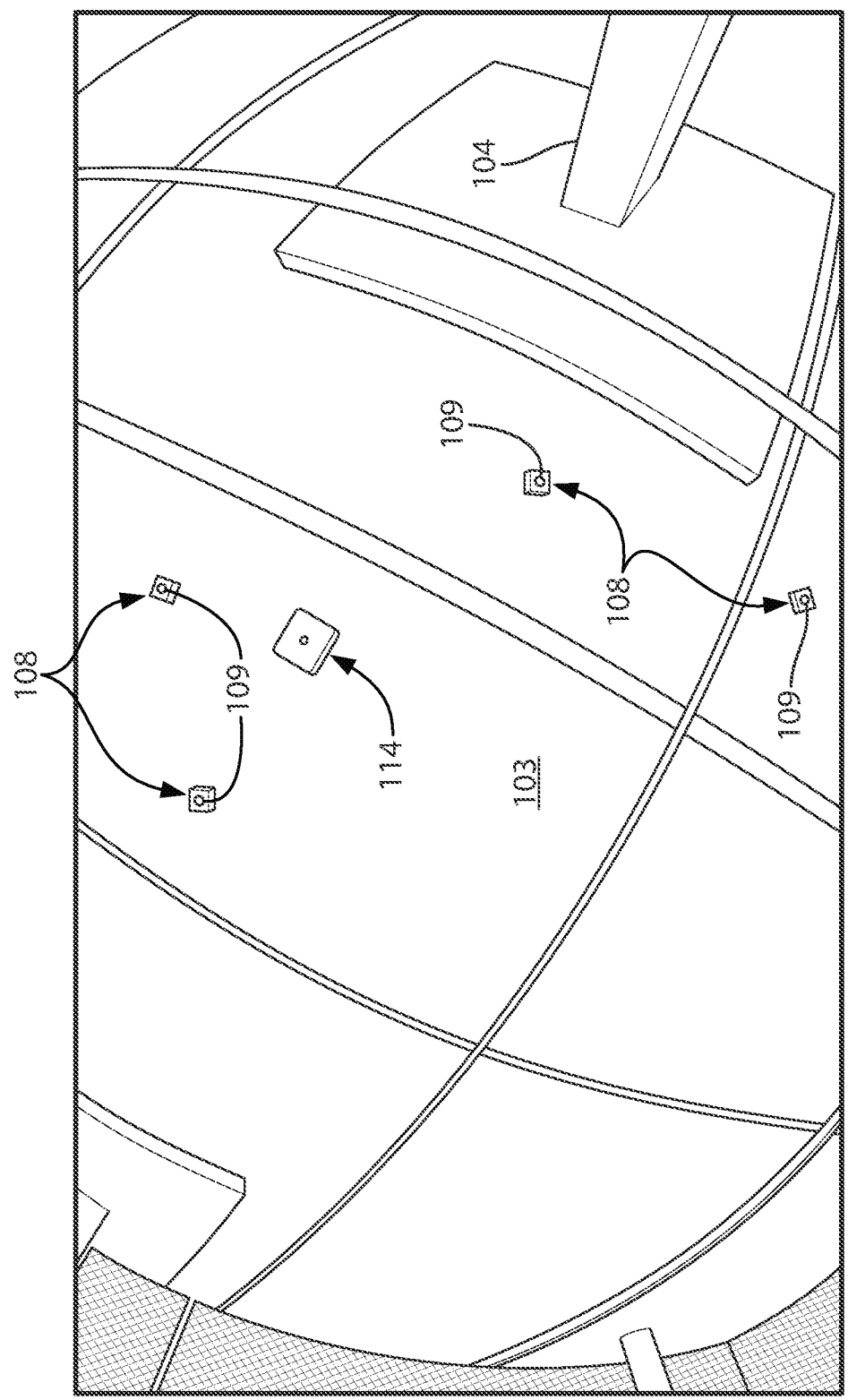
FIG. 3 is a view of a ceiling from the perspective of an upward-facing fisheye camera.

FIG. 3 illustrates a view of a ceiling 103 captured by a robot fisheye camera 118. A plurality of network nodes 108, including respective stationary cameras 109, are fixed to the ceiling 103. Because the fisheye camera 118 faces upward with a view of the ceiling 103 of the structure 101 of the structure 101, images captured by the camera 118 can be referred to as upward images.

Figure 4:
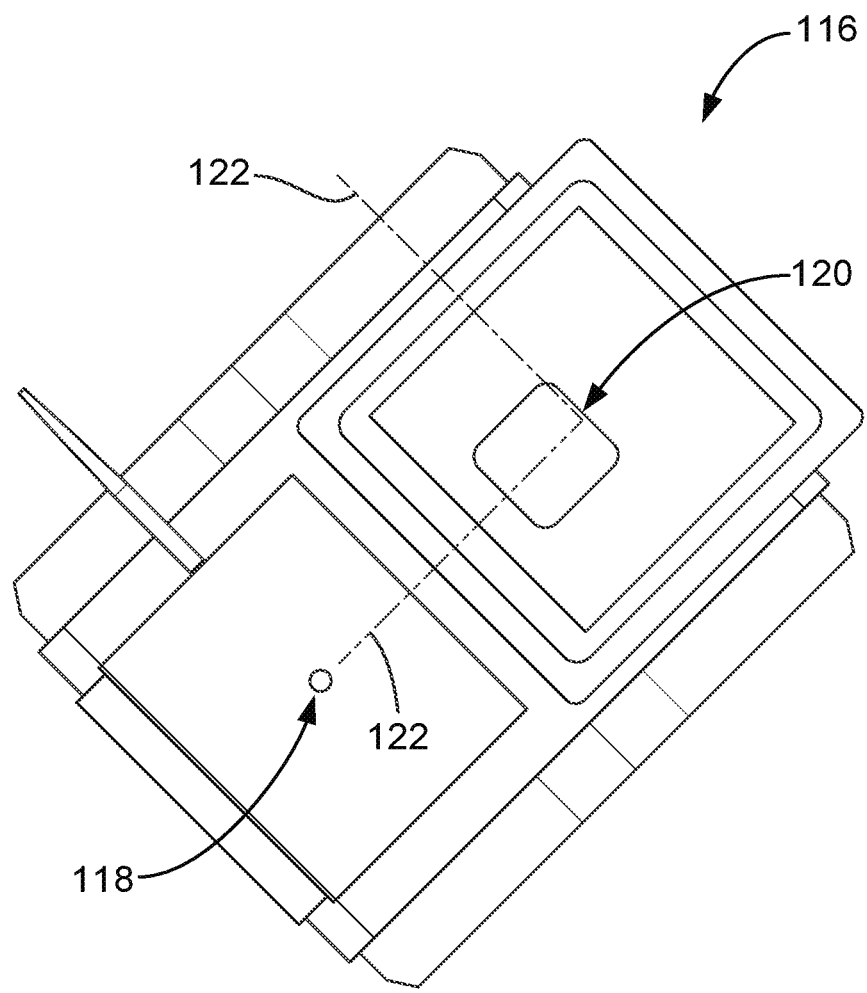
FIG. 4 is a top view of the mobile robot.

FIG. 4 illustrates a view of the mobile robot 116 captured by a stationary camera 109 fixed to the structure ceiling 103. As illustrated in FIG. 4, reference axes 122 can be defined with respect to the marker 120. For example, a first axis 122 can be defined along a longitudinal center of the marker 120, i.e., the axis 122 is a line that divides the marker 120 in half in a direction substantially parallel to or along a forward direction of the robot 116. A second axis 122 can be defined perpendicular to the first axis 122, e.g., as in the illustrated example, along an edge of the marker 120. Because the stationary cameras 109 are facing down with a view of the floor 102 of the structure 101, images captured by the cameras 109 can be referred to as downward images. Further, is to be understood that implementations are possible in which cameras 109 are fixed or mounted other than to a ceiling 103. For example, principles discussed herein would be applicable to downward-facing cameras 109 affixed to a wall, beam, rafter, pole, etc., so long as the downward-facing camera was stationary, i.e., installed so as to have an unchanging pose.

Example Environment and Notation

Figure 5:
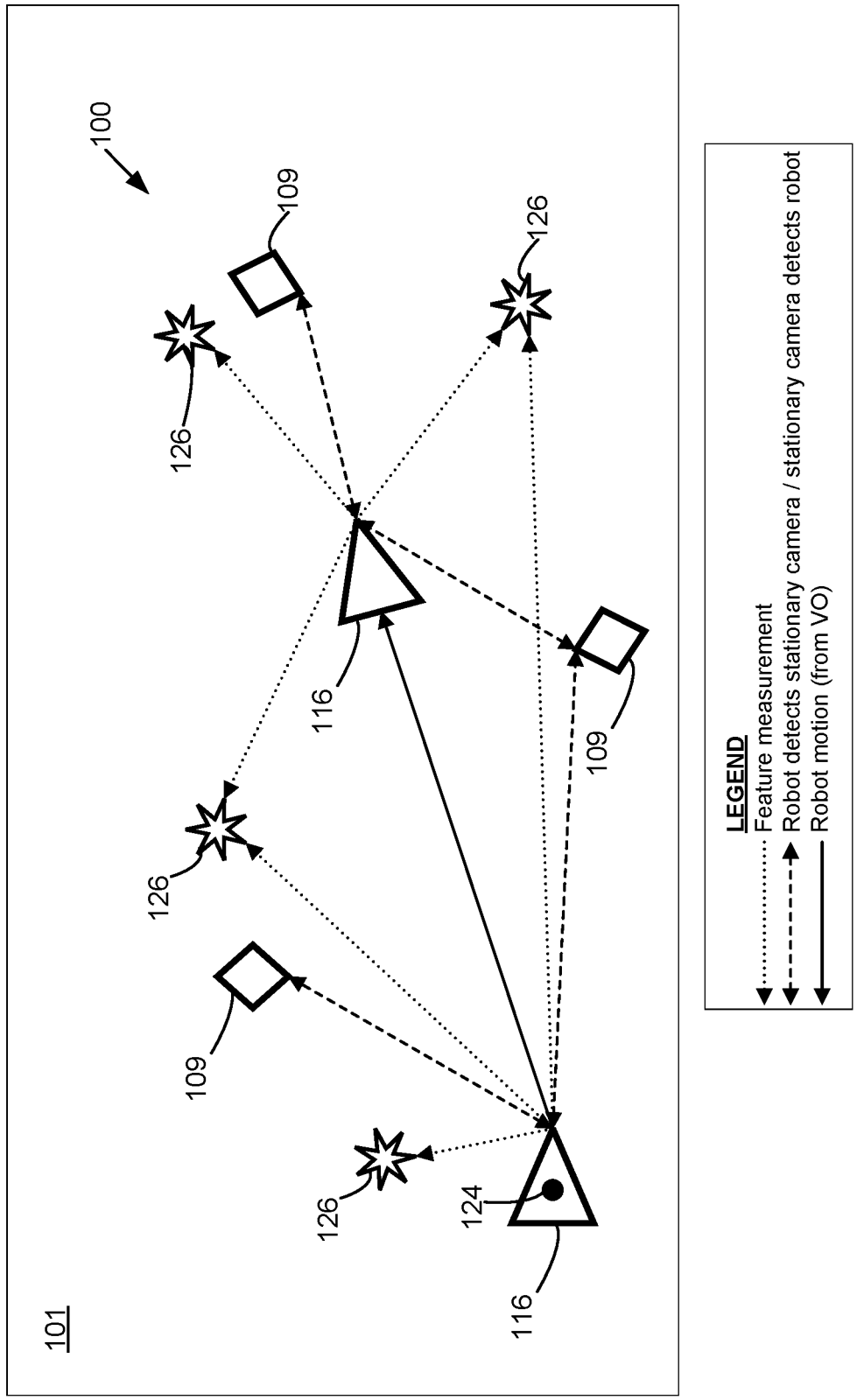
FIG. 5 is a diagram illustrating motion of the mobile robot.

FIG. 5 is a diagram providing a schematic view of a calibration operation of the system 100 conducted by moving the robot 116. The robot 116 is illustrated in two locations at which it can obtain images of one or more stationary cameras 109, and at which one or more stationary cameras 109 can obtain images of the mobile robot 116, e.g., including the marker 120 on the mobile robot 116. These images can be used to determine poses of the respective cameras 109, as described herein.

Figure 6:
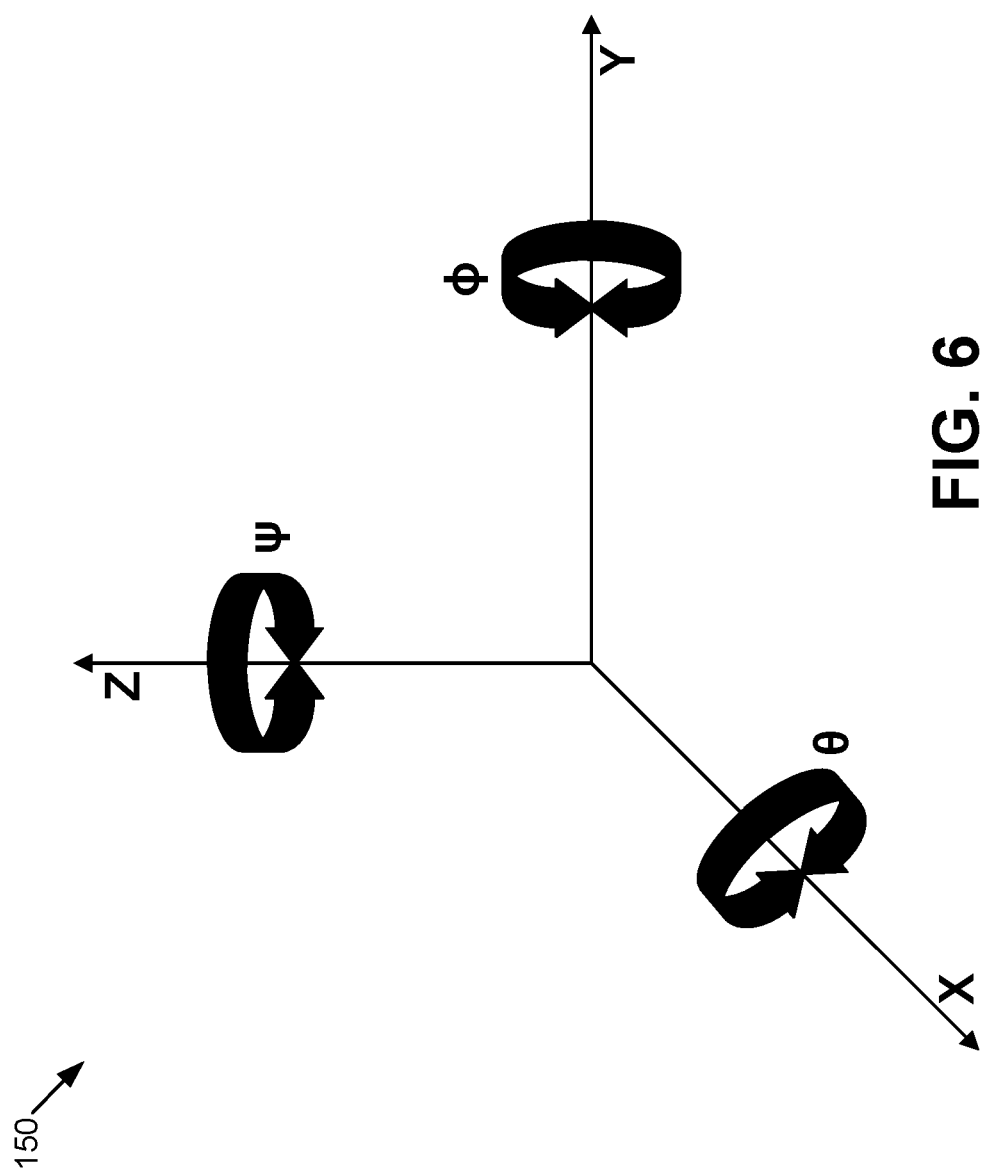
FIG. 6 illustrates a coordinate system.

FIG. 6 illustrates how a pose can be described in a three-dimensional coordinate system 150. A pose herein means a location and orientation of an object such as a camera 109 in three-dimensional space. That is, the location is specified with respect to the coordinate system 150 by X, Y, and Z coordinates of the object. The orientation is specified by a pitch component (θ), a roll component (φ), and a yaw component (ψ), i.e., rotations about X-, Y-, and Z-axes, respectively. Herein a six-degree-of-freedom (6-DoF) pose can be expressed as a homogeneous transformation matrix:

$$T = \begin{bmatrix} R(q) & p \\ 0 & 1 \end{bmatrix},$$

Where rotation R is represented as a quaternion q, and a position p is a $R^{3\times 1}$ vector.

A 6-DoF pose in examples herein can be determined and described with reference to a global frame of reference (or simply global frame) W. A coordinate system for the global frame W can be defined by an origin 124 of robot 116 motion (see FIG. 5), e.g., as estimated using visual odometry (VO), a known technique for analyzing images to determine a position and/or orientation of a moving robot. The fisheye camera 118, designated by F, can then have a pose $T_F^W$ that is synonymous with the robot 116 pose.

The system 100 can include a number of N stationary cameras 109, i.e., where each camera 109 in the system 100 can be represented by $\{C_k\}_{k=0:N-1}$, and where each camera 109 (i.e., each camera $C_k$) has a corresponding pose $\{T_{C_k}^W\}_{k=0:N-1}$. The marker 120, represented as M, when detected by a camera 109 results in a marker detection pose measurement, which represents the pose $T_M^{C_k}$ of the marker 120 in the frame of a given camera $C_k$. Further, there is a spatial offset $T_M^F$; between the fisheye camera 118 and the marker 120, e.g., a distance measured horizontally from a center of the camera 118 lens to the nearest edge of the marker 120.

As seen in FIG. 5, a structure 101 can include a plurality of point features 126 detected and tracked, i.e., as pixels ∈ $R^2$ in images from the fisheye camera 118, to perform the VO that is used for robot 116 pose estimation as described herein. Further, the fisheye camera 118 can detect the stationary cameras 109 as two-dimensional (2D) pixels (∈ $R^2$) in the image plane of the fisheye camera at 118, these measurements being used as described below to constrain variables optimized in the camera 109 pose estimation process described herein.

Time Synchronization

The computer 112 can include a Network Time Protocol (NTP) server to synchronize clocks of network nodes 108 and the robot computer 117. It will be appreciated that the resulting synchronization can have an error in the range of 1 to 2 milliseconds between the times on the server's client devices, e.g., network nodes 108 and robot computer 117, and the NTP server itself. However, because the cameras 109, 118 operate asynchronously (i.e., they are not triggered or actuated together or with reference to one another, and may capture images at different frame rates), synchronization errors with respect to image capture is not consequential.

Determining Stationary Camera Poses

As disclosed herein, it is possible to determine poses $\{T_{C_k}^W\}_{k=0:N-1}$ of respective stationary cameras 109 ($\{C_k\}_{k=0:N-1}$,) based on images from the stationary cameras 109 and from the robot camera 118. To estimate the poses of the cameras 109, robot 116 poses, i.e., fisheye camera 118 poses, $T_F^W$ are determined by determining a marker 120 pose $T_M^{C_k}$ and the constant spatial offset $T_M^F$ between the camera 118 and the marker 120. Then a marker 120 detection pose measurement $T_M^F$, i.e., by a camera 109, can be used to estimate the global pose of a camera 109, $\{T_{C_k}^W\}$ (because $T_{C_k}^W = T_F^W T_M^F T_M^{C_k}$).

Accordingly, and as discussed in more detail below, the calibration process herein, i.e., a process for determining global poses of cameras 109, can begin by using VO to determine and unscaled pose $T_F^W$ of a robot 116. Further, based on VO, it is possible to determine an unscaled map, i.e., a set of three-dimensional points 126 obtained from 2D feature detection and tracking, such points 126 being designated as $X_k \in R^3)_{k=0:p-1}$. Next, marker 120 pose measurements $T_M^{C_k}$ can be us to (1) determine a metric scale s of the robot pose, $T_F^W$, and (2) to estimate the spatial offset $T_M^F$. Then, two-way measurements, i.e., marker 120 detection pose measurements $T_M^{C_k}$ from detection of the marker 120 by the cameras 109, and detection of the cameras 109 by the fisheye camera 118, can be used to jointly optimize the camera 109 poses $\{T_{C_k}^W\}_{k=0:N-1}$, along with other variables like the robot 116 pose and the environment map of three points.

Estimating Motion Using Visual Odometry (VO)

Figure 7:
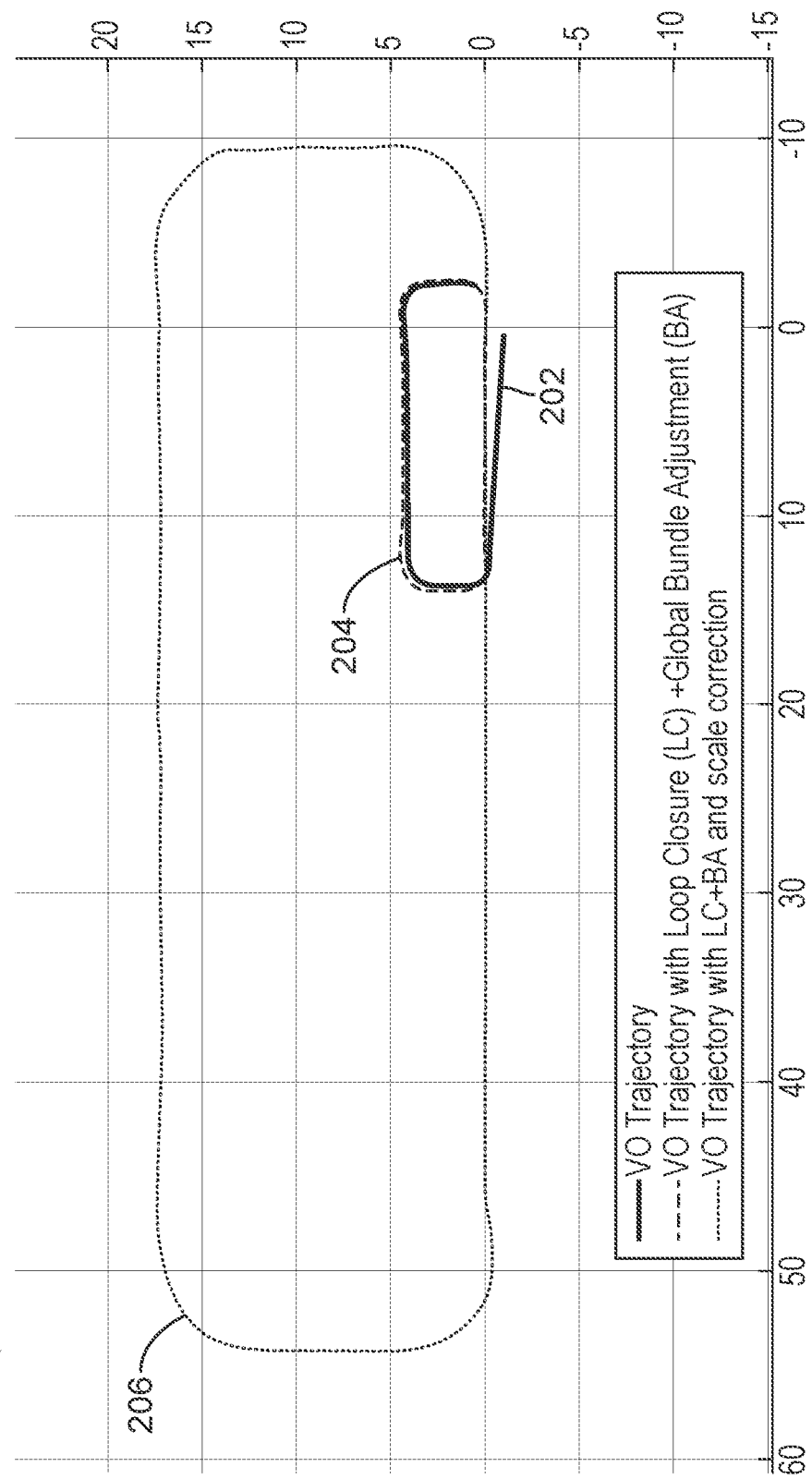
FIG. 7 illustrates plots of a visual odometry trajectory of the mobile robot.

Visual odometry can be used to record motion of a robot 116 as illustrated in the graph 200 FIG. 7. Although other techniques could be used, visual odometry is a useful technique for capturing motion of the robot 116 for purposes of this disclosure because, as will be understood, it is both straightforward to implement and known to work with wide-angle, i.e. fisheye, lenses. Once a visual odometry trajectory 202 is plotted, loop closure and bundle adjustment techniques can be implemented to eliminate drift to obtain adjusted VO trajectory 204. Such techniques are known; see, e.g., D. Gálvez-Lopez and J. D. Tardós, "Bags of binary words for fast place recognition in image sequences," IEEE Transactions on Robotics, vol. 28, pp. 1188-1197, October 2012; S. Agarwal, K. Mierle et al., "Ceres solver." http://ceressolver.org. accordingly, to eliminate drift, the reprojection error residual provided in Equation 1 below is used in the minimization specified in Equation 2.

$$r_{kj} = \begin{bmatrix} u \\ v \end{bmatrix}_{kj} - \pi(K, T_{F_j}^W, X_k) \quad (1)$$

$$\{\hat{T}_{F_j}^W\}_{j=0:M-1}, \{\hat{X}_k\}_{k=0:P-1} = \quad (2)$$

$$\operatorname{argmin}_{\{T_{F_j}^W\}_{j=0:M-1}, \{\hat{X}_k\}_{k=0:P-1}} \sum_{j=0}^{M-1} \sum_{k=0}^{N-1} w_{kj} \|r_{kj}\|^2$$

In Equation 2, $w_{kj}=1$ if a 3D-point 126 ($X_k$) is visible in the $j^{th}$ robot keyframe; otherwise, $w_{kj}=0$. Further, in Equation 1, K represents intrinsic calibration parameters of the fisheye camera, and it represents the fisheye projection model, such as are known. For example, intrinsic calibration is known to define optical properties of a camera lens including a focal point, a principal point, and distortion coefficients that can be represented in a 3-by-3 matrix. For the loop closure and bundle adjustment processes, M keyframes captured by the robot camera 118 are extracted to generate the adjusted VO trajectory 204.

Because the data to plot VO trajectory 202 is obtained asynchronously, pose interpolation can be used to associate a pose of the mobile robots 116 to each detection of the marker 120 by a stationary camera 109. For example, if detection of a marker 120 has a timestep indicated by a timestamp $t \in (t_i, t_j)$, where $t_i$ and $t_j$ are the timestamps of the robot keyframes with poses $$T_{F_i}^W = \begin{bmatrix} R(q_{F_i}^W) & p_{F_i}^W \\ 0 & 1 \end{bmatrix} \text{ and } T_{F_j}^W = \begin{bmatrix} R(q_{F_j}^W) & p_{F_j}^W \\ 0 & 1 \end{bmatrix}$$

respectively, then the robot pose $T_F^W(t)$ at time t is determined by taking the weighted average of $p_{F_i}^W$ and $p_{F_j}^W$ for the linear translation component and Spherical Linear Interpolation, which, as will be recognized, is sometimes referred to as "slerp," for the rotation component. See, e.g., K. Shoemake, "Animating rotation with quaternion curves," SIGGRAPH Comput. Graph., vol. 19, p. 245-254, July 1985. Then it is possible to associate each marker 120 detection $T_M^{C_k}(t)$ with an interpolated robot pose $T_F^W(t)$ to then determine a metric scale s of the robot 116 trajectory using spatial visual odometry, and to determine the spatial offset $T_M^F$ between the fisheye camera 118 and the marker 120, and to initialize poses $\{T_{C_k}^W\}_{k=0:N-1}$ of the stationary cameras.

Determining Scale and Spatial Offset with Marker Detections

The pose $T_M^{C_k}$ of a marker 120 (represented as M) in a frame $C_k$ can be used to determine the metric scale s of an estimated adjusted VO trajectory 204 obtained as described above and can also be used to determine spatial offset $T_M^F$ between the fisheye camera 118 (F) and the marker 120 (M). For this determination, a known motion calibration technique (see, e.g., Z. Taylor and J. Nieto, "Motion-based calibration of multimodal sensor arrays," in 2015 IEEE International Conference on Robotics and Automation (ICRA), pp. 4843-4850, 2015), can be used to align robot 116 motion estimated in adjusted trajectory 204 with motion of the marker 120 estimated by detection in a frame $C_k$ from a camera 109. For two adjacent robot keyframes $F_i$ and $F_j$, nearest marker 120 detection measurements $T_{M_i}^{C_k}$ and $T_{M_{i+1}}^{C_k}$ in a same frame are determined by comparing timestamps of the measurements. Then, pose interpolation (as mentioned above) can be used to determine respectively corresponding robot 116 poses $_{int}T_{F_i}^W$ and $_{int}T_{F_{i+1}}^W$. That is, robot 116 poses given by $_{int}T_{F_{i+1}}^{F_i}(=(_{int}T_{F_i}^W)^{-1}{_{int}T_{F_{i+1}}^W})$ are aligned with marker 120 poses given by $T_{M_{i+1}}^{M_i}(=(T_{M_i}^{C_k})^{-1}T_{M_{i+1}}^{C_k})$, and in the process of alignment a metric scale s of the robot 116 trajectory, and also a spatial offset $T_M^F$ between the fisheye camera 118 (F) and the marker 120 (M), is determined.

The adjusted VO trajectory 204 can be modeled with the scale factor s multiplied by a translation component $_{int}p_{F_{i+1}}^{F_i}$. Then a non-linear least-squares optimization problem can be solved to determine unknown variables, where the residual $r_i$ for this optimization process is given by:

$$r_i = {_{int}T_{F_{i+1}}^{F_i}} T_M^F \ominus T_M^F T_{M_{i+1}}^{M_i} \quad (3)$$

The $\ominus$ symbol specifies a subtraction operation that is differentiated from standard subtraction in Euclidean space, and rather specifies an operation on manifolds. Robot 116 poses can then be modeled as follows:

$$_{int}T_{F_{i+1}}^{F_i} = \begin{bmatrix} R(_{int}q_{F_{i+1}}^{F_i}) & s \cdot_{int} p_{F_{i+1}}^{F_i} \\ 0 & 1 \end{bmatrix}.$$

Assuming that $T_M^F$ is known (e.g., as described further below), we can solve for s, and for $T_M^F$ by minimizing a non linear cost function formed by residuals $r_i$ given in Equation 3 using an optimization library. For example, using the ceres solver of Agarwal, Mierle, et al., mentioned above, the following equation can be employed:

$$\hat{s}, \hat{T}_M^F = \underset{s \in R, T_M^F \in SE(3)}{\mathrm{argmin}} \sum_{i=0}^{L-1} \|r_i\|^2 \quad (4)$$

The adjusted trajectory 204 can then be rescaled according to the scale s to obtain the scaled trajectory 206. The scaled trajectory 206 and the estimated spatial offset can then be used to initialize poses of the cameras 109. The calibration robot 100 trajectory 202 is generally planar, so that the present calibration works without estimating complete 6-DoF calibration parameters between the fisheye camera 118 and the marker 120 (because, as will be recognized, motion-based calibration methods require rotation about two non-parallel or non-anti-parallel axes for complete observability).

Alternative Determination of the Spatial Offset when Scale is Known

As an alternative to determining the spatial offset as shown in equation (4), if the scale has been determined, then the residual $r_i$ of Equation 3 can be used to determine the spatial offset $T_M^F$ between the marker 120 and the fisheye camera 118.

$$\hat{T}_M^F = \mathrm{argmin}_{T_M^F \in SE(3)} \sum_{i=0}^{L-1} \|r_i\|^2 \quad (5)$$

As will be appreciated, Equation 4 depends on determining the spatial offset $T_M^F$ and Equation 5, and Equation 5 depends on the scale s from Equation 4. Accordingly, these equations are typically solved iteratively, i.e., sequentially several times in a loop, to arrive at a final estimate of scale s and the spatial offset $T_M^F$. As stated above, the adjusted trajectory 204 can then be rescaled according to the scale s to obtain the scaled trajectory 206, and the scaled trajectory 206 and the estimated spatial offset can then be used to initialize poses of the cameras 109.

Estimating Poses of Environment Cameras

Poses of stationary cameras 109 are first initialized ($\{T_{C_k}^W\}_{k=0:N-1}$), and then an optimization is performed to estimate the camera 109 poses as a result of a robot 116 moving through or in a structure 101.

To perform the initialization, with respect to each camera 109 (represented as $C_k$), a set is assembled of marker 120 pose measurements $\{T_{M_i}^{C_k}\}_{i=0:N_k-1}$, that measure poses of the marker 120 in the camera 109 frame as the robot 116 is captured in images by the camera 116. Respective timestamps of the marker 120 poses can be used to determine a robot 116 pose $\{_{int}T_{F_i}^W\}_{i=0:N_{k-1}}$ using interpolation, as mentioned above. Then for each marker 120 measurement $T_{M_i}^{C_k}$ and corresponding interpolated robot pose $_{int}T_{F_i}^W$, a pose of a stationary camera 109 ($C_k$) can be determined from equation 6:

$$T_{C_{k_i}}^W = {_{int}T_{F_i}^W} \hat{T}_M^F \left(T_{M_i}^{C_k}\right)^{-1} \quad (6)$$

Equation 6 can be performed for $N_k$ measurements from a given camera 109 ($C_k$) to then calculate a mean of $\{T_{C_k}^W\}_{k=0:N-1}$, which provides an initialized pose of the camera 109. Then, to translate components of the mean of $\{T_{C_k}^W\}_{k=0:N-1}$, a centroid can be computed. Then, for the rotation components, which are parameterized as quaternions, quaternion averaging can be performed, e.g., as is known from Z. Zhang and D. Scaramuzza, "A tutorial on quantitative trajectory evaluation for visual(-inertial) odometry," in 2018 IEEE/RSJ International Conference on Intelligent Robots and Systems (IROS), pp. 7244-7251, 2018. This initialization can be performed for all cameras 109 being calibrated ($\{C_k\}_{k=1:N}$) to initialize their respective 6-DoF poses.

Once the camera 109 poses are initialized, an optimization can be performed to minimize the reprojection error between a projection $\pi(K, T_{F_j}^W T_{C_k}^W)$ of an initialized stationary camera 109 pose $T_{C_k}^W$ and a corresponding pixel detection $$\begin{bmatrix} u \\ v \end{bmatrix}_{kj}$$

from the upward facing fisheye camera 118 image, e.g., obtained using a suitable blob detection algorithm such as provided by OpenCV (Open Source Computer Vision Library; see opencv.org). Each projection $\pi(K, T_{F_j}^W, T_{C_k}^W)$ is associated to a pixel detection $$\begin{bmatrix} u \\ v \end{bmatrix}_{kj}$$

by performing a nearest neighbor search. Then Equation 7 can be used to obtain a residual that minimizes the reprojection error:

$$r_{kj} = \begin{bmatrix} u \\ v \end{bmatrix}_{kj} - \pi\left(K, T_{F_j}^W T_{C_k}^W\right) \quad (7)$$

$R_{kj}$ can be defined as the reprojection error of the $k^{th}$ stationary camera 109 when viewed from $j^{th}$ the robot 116 key-frame pose. K and $\pi$ are the intrinsic calibration parameters in the fisheye projection model of the fisheye camera 118, respectively. Equation 8 from the ceres library discussed above can be used to then solve the minimization problem:

$$\{\hat{T}_{C_k}^W\}_{k=0:N-1} = \mathrm{argmin}_{\{T_{C_k}^W\}_{k=0:N-1,} \in SE(3)} \sum_{j=0}^{M-1} \sum_{k=0}^{N-1} w_{kj} \|r_{kj}\|^2 \quad (8)$$

In Equation 8, if a given stationary camera 109 ($C_k$) is visible in the $j^{th}$ robot key-frame $W_{kj}=1$; otherwise $W_{kj}=0$. The optimization of Equation 8 optimizes only a translation component, and not a rotation component, of stationary camera 109 poses $\{T_{C_k}^W\}_{k=0:N-1}$. The rotation component can be optimized by minimizing a cost function (see Equation 10) using an epipolar constraint between two stationary cameras 109 that have a shared field of view as a residual, as shown in Equation 9.

$$_{l}r_{ij} = _{l}x_i^T E_{ij} x_j \quad (9)$$

In Equation 9, $E_{ij}=[p_{C_j}{}^{C_i}]\times R_{C_j}{}^{C_i}=[(R_{C_i}{}^W)^T(p_{C_j}{}^W-p_{C_i}{}^W)]\times(R_{C_i}{}^W)^T R_{C_j}{}^W$ is the essential matrix between $i^{th}$ and $j^{th}$ stationary cameras 109 having poses $$T_{C_i}^W = \begin{bmatrix} R_{C_i}^W & p_{C_i}^W \\ 0 & 1 \end{bmatrix} \text{ and } T_{C_j}^W = \begin{bmatrix} R_{C_j}^W & p_{C_j}^W \\ 0 & 1 \end{bmatrix},$$

respectively, and $\{_I x_i\}_{l=0:3}$ and $\{_I x_j\}_{l=0:3}$ refer to corresponding corners of the marker 120 detected in stationary cameras 109 $C_i$ and $C_j$, respectively. Then the optimization problem from the epi-polar constraint (Equation 9) is given in Equation 10:

$$\{\hat{T}_{C_k}^W\}_{k=0:N-1} = \underset{\{T_{C_k}^W\}_{k=0:N-1,} \in SE(3)}{\operatorname{argmin}} \sum_{i\neq j}\sum_{l=0}^{3} w_{ij}r_{ij} \quad (10)$$

In Equation 10, if stationary cameras 109 $C_i$ and $C_j$ capture the robot 116 simultaneously, then $W_{kj}=1$; otherwise $W_{kj}=0$.

Further, in addition to optimizing for stationary camera 109 poses $\{T_{C_k}{}^W\}_{k=0:N-1}$, an optimization can also be performed for the robot 116 keyframe poses $\{T_{F_j}{}^W\}_{j=0:M-1}$ and 3D map $\{X_k\}_{k=0:P-1}$ by solving Equations 2, 8, and 10 together.

Figure 8:
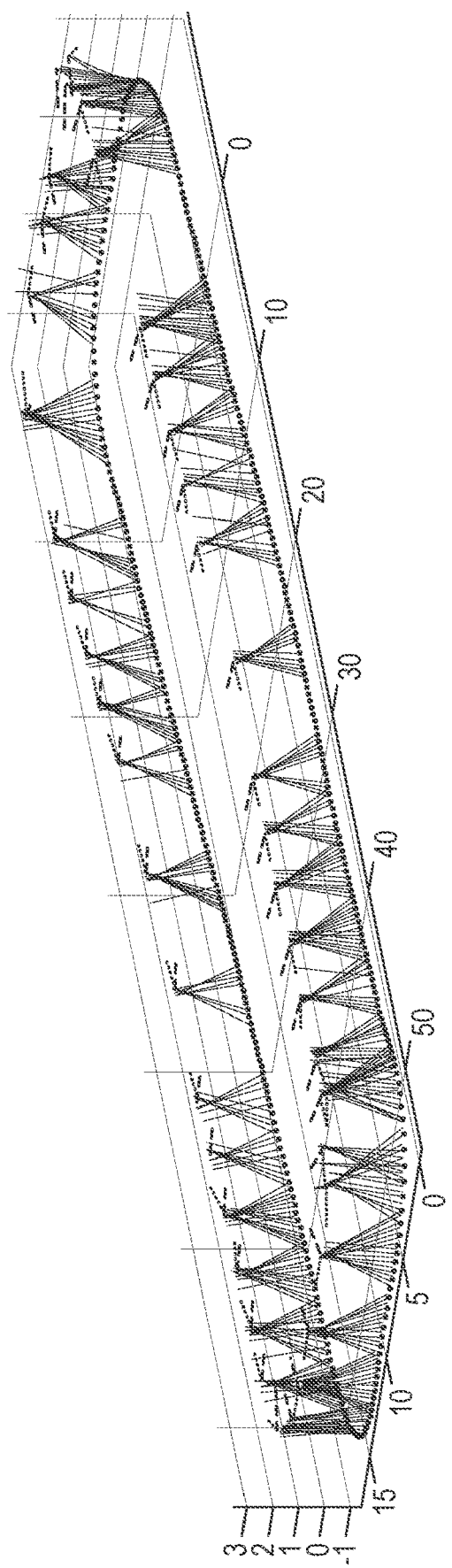
FIG. 8 shows a plot of estimated poses of cameras and trajectories of a robot with marker pose measurements.

It should be noted that initializing and determining final estimates of stationary camera 109 poses requires not only detection of the calibration robot 116 by the stationary cameras 109, but also detection of the stationary cameras 109 by the robot fisheye camera 118. In other words, variables and the above equations are constrained by considering both perspectives. FIG. 8 shows a plot of estimated poses of cameras 109 (dotted lines) and trajectories of the robot 116 (dashed lines) with marker 120 pose measurements (solid lines).

Once the optimization of Equation 10 is performed, it is possible to calibrate the system 100, that is, to determine poses of cameras 109 that can then be used to detect and control vehicles 105 in the structure 101.

Example Process

Figure 9:
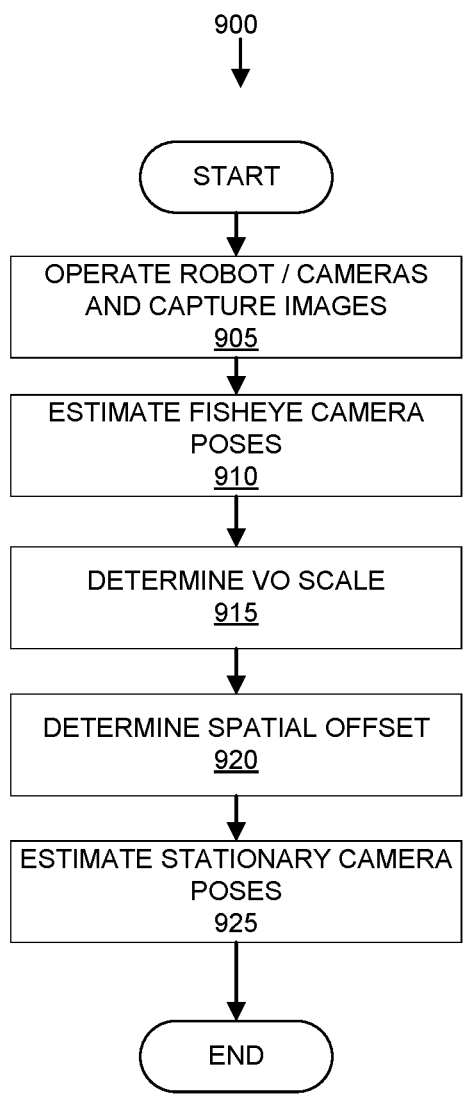
FIG. 9 is a process flow diagram illustrating an example calibration process in the calibration mode of the locator system.

FIG. 9 is a process flow diagram illustrating an example calibration process 900 in the calibration mode of the locator system 100. The process begins in a block 905, in which a robot 116 including a fisheye camera 118 and a marker 120 is operated in a facility 101. As explained above, the robot 116 can have a trajectory through the facility 101 that is determined based on visual odometry.

Next, in a block 910, a computer 109 or some other computer, having received data such as described above from the robot computer 117, e.g., images from the robot camera 118, and from stationary cameras 109, can estimate fisheye camera 118 poses, e.g., as described above with respect to equations 1 and 2.

Next, in a block 915, a VO scale s can be determined as described above with respect to equations 3 and 4. As explained above, the scale s is a value applied to VO data. The scale can approximate a real-world scale so that data collected while operating the mobile robot 116 according to VO can be applied to pose estimates of stationary cameras 119.

Next, in a block 920, the spatial offset between a marker 120 and camera 118 can be determined, e.g., as described above concerning Equation 5 which can be solved in conjunction with Equation 4, as described above.

Next, in a block 925, poses of stationary cameras 109 can be estimated, e.g., as described above concerning equations 6-10. The poses of the cameras 109 can then be stored in the computer 112 and used to determine locations and/or poses of vehicles 105 in a structure 101 to thereby operate the vehicles 105. For example, techniques are known for determining a location and/or pose of an object such as a vehicle 105 based on image data when a pose of a camera or cameras such as a camera 109 capturing the image or images is known.

Figure 10:
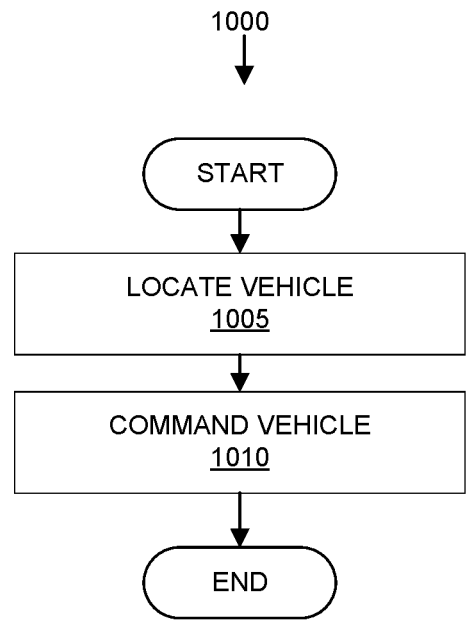
FIG. 10 is a process flow diagram illustrating a vehicle operated in the locator system in the operation mode.

FIG. 10 is a process flow diagram of an example process 1000 illustrating a vehicle 105 operated in the locator system 100 in the operation mode. The process 1000 begins in a block 1005 in which a vehicle 105 is located based on data from cameras 109. As explained above, the cameras 109 have calibrated poses stored in the computer 112, such that the computer 112 can determine a location and/or pose of a vehicle 105.

Next, in a block 1010, the computer 112 can command a vehicle 105. For example, if the vehicle 105 is an autonomous vehicle, e.g., able to receive commands to operate propulsion, breaking, and/or steering based on a command from the computer 112, the computer 112 can provide a command to move the vehicle based on data from the cameras 109. Alternatively or additionally, the computer 112 could provide a command to be implemented by a vehicle operator, e.g., displayed in a human machine interface (HMI) or the like of the vehicle 105. Following the block 1010, the process 1000 ends.

CONCLUSION

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Use of in response to, based on, and upon determining herein indicates a causal relationship, not merely a temporal relationship. "Based on" or "in response to" can mean based at least partly on or at least partly in response to unless explicitly stated otherwise.

Computer executable instructions may be compiled or interpreted from computer 100 programs created using a variety of programming languages and/or technologies, including, without limitation, and either alone or in combination, Java, C, C, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer 100. Common forms of computer-readable media include, for example, RAM, a PROM, an EPROM, a FLASH-EEPROM, any other memory chip or cartridge, or any other medium from which a computer can read.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A method, comprising: moving a robot in a structure that includes a plurality of downward-facing cameras, and, as the robot moves: capturing upward images with an upward-facing camera mounted to the robot, and capturing downward images with the respective downward-facing cameras;
   determining upward-facing camera poses at respective times based on the upward images; and
   determining respective poses of the downward-facing cameras based on (a) determining motion of the robot from the downward images, and (b) the upward-facing camera poses determined from the upward images.

2. The method of claim 1, wherein determining upward-facing camera poses at respective times based on the upward images includes estimating motion of the robot from visual odometry.

3. The method of claim 1, wherein determining the motion of the robot in the downward images includes determining a scale of the motion based on a fiducial marker fixed to the robot.

4. The method of claim 3, wherein determining the motion of the robot in the downward images includes determining a spatial offset between the fiducial marker and the upward-facing camera based on the scale.

5. The method of claim 4, wherein the scale is determined from an interpolated robot pose determined from averaging translation and rotation components of first and second robot poses measured at first and second timesteps.

6. The method of claim 4, wherein the scale is determined from at least some of the upward images and at least some of the downward images.

7. The method of claim 1, further comprising optimizing the respective poses of the downward-facing cameras by optimizing a translation component of the respective poses to minimize a reprojection error of the upward-facing camera.

8. The method of claim 1, further comprising optimizing the respective poses of the downward-facing cameras by optimizing a rotation component of the camera poses by minimizing a constraint between two of the plurality of downward-facing cameras that have an overlapping field of view.

9. The method of claim 1, further comprising determining the upward-facing camera poses by minimizing residual error in detections of 3-D points with the upward-facing camera.

10. The method of claim 1, further comprising commanding actuation of the vehicle based on second downward images captured after the respective poses of the downward-facing cameras have been determined.

11. A system, comprising a processor and a memory, the memory storing instructions executable such that the processor is programmed to: receive images from a first downward-facing camera that is one of a plurality of downward-facing cameras;
    determine a location of a vehicle based on the images and a pose of the first downward-facing camera; and
    command actuation of the vehicle based on the determined location;
    wherein the pose of the downward facing camera is based on (a) determining robot poses of a robot including an upward-facing camera capturing upward images of the respective plurality of downward-facing cameras, and (b) determining motion of the robot in downward images captured by respective downward-facing cameras.

12. The system of claim 11, wherein determining upward-facing camera poses at respective times based on the upward images includes estimating motion of the robot from visual odometry.

13. The system of claim 11, wherein determining the motion of the robot in the downward images includes determining a scale of the motion based on a fiducial marker fixed to the robot.

14. The system of claim 13, wherein determining the motion of the robot in the downward images includes determining a spatial offset between the fiducial marker and the upward-facing camera based on the scale.

15. The system of claim 13, wherein the scale is determined from an interpolated robot pose determined from averaging translation and rotation components of first and second robot poses measured at first and second timesteps.

16. The system of claim 15, wherein the scale is determined from at least some of the upward images and at least some of the downward images.

17. The system of claim 15, wherein the respective poses of the downward-facing cameras are optimized by optimizing a translation component of the respective poses to minimize a reprojection error of the upward-facing camera.

18. The system of claim 15, wherein the respective poses of the downward-facing cameras are optimized by optimizing a rotation component of the camera poses by minimizing a constraint between two of the plurality of downward-facing cameras that have an overlapping field of view.

19. The system of claim 15, wherein the upward-facing camera poses are determined by minimizing residual error in detections of 3-D points with the upward-facing camera.

20. The system of claim 15, wherein actuation of the vehicle is commanded based on second downward images captured after the respective poses of the downward-facing cameras have been determined.

* * * * *